United States Patent [19]

Kubiak

[11] Patent Number: 4,708,221
[45] Date of Patent: Nov. 24, 1987

[54] TREE STAND WITH PIN UP SYSTEM
[75] Inventor: Robert E. Kubiak, Robbinsville, N.J.
[73] Assignee: Foxcraft, Inc., Robbinsville, N.J.
[21] Appl. No.: 152
[22] Filed: Jan. 2, 1987
[51] Int. Cl.⁴ .................... A45F 3/26; A01M 31/02
[52] U.S. Cl. ................................. 182/187; 182/92; 248/217.4; 248/218.2; 248/546
[58] Field of Search ............... 182/187, 188, 92, 150; 248/546, 217.4, 218.2; 108/152

[56] References Cited
U.S. PATENT DOCUMENTS

| | | |
|---|---|---|
| 481,724 | 8/1892 | Westover . |
| 706,292 | 8/1902 | Beaton . |
| 965,697 | 7/1910 | Earnest . |
| 1,406,751 | 2/1922 | Morgan .............................. 248/546 |
| 1,437,864 | 12/1922 | Rube et al. . |
| 1,588,566 | 6/1926 | Wismer . |
| 2,031,615 | 2/1936 | McKinney .......................... 182/221 |
| 3,298,459 | 1/1967 | Bergsten ............................. 182/92 |
| 3,380,697 | 4/1968 | Melcher .............................. 182/92 |
| 3,498,409 | 3/1970 | Meyer .................................. 182/92 |
| 3,719,252 | 3/1973 | Tiley .................................. 182/187 |
| 3,729,160 | 4/1973 | D'Imperio ........................... 108/152 |
| 3,817,350 | 6/1974 | Gray .................................. 182/187 |
| 3,949,835 | 4/1976 | Butler ................................ 182/187 |
| 3,961,686 | 6/1976 | Starkey ............................... 182/187 |
| 3,990,537 | 11/1976 | Swenson ............................. 182/187 |
| 4,413,706 | 11/1983 | Michael .............................. 182/92 |
| 4,415,061 | 11/1983 | Meyer ................................ 182/92 |
| 4,445,591 | 5/1984 | Mitchell ............................. 182/222 |
| 4,474,265 | 10/1984 | Shinkle ............................... 182/187 |
| 4,475,627 | 10/1984 | Eastridge ............................ 182/187 |

FOREIGN PATENT DOCUMENTS

67545 7/1892 Fed. Rep. of Germany ...... 182/187
286577 6/1914 Fed. Rep. of Germany ...... 182/187

Primary Examiner—Reinaldo P. Machado
Attorney, Agent, or Firm—Richard C. Woodbridge; Alan M. Sack

[57] ABSTRACT

A tree stand includes a pin up system for easy attachment and removal to a tree high above the ground. The tree stand includes a frame and a platform attached to the frame for supporting the weight of a user and equipment. A hanger stud having a rectangular cross section projects from the frame towards the ground. The tree stand is attached to the tree trunk with a hanger pin which includes a shank with a pointed screw tip at one end for penetrating into the tree trunk. A crank is attached to the shank for rotating the shank and facilitating penetration of the screw tip and shank into the tree trunk. A stud holder is attached to the shank and has an aperture with the same rectangular cross-sectional shape as the hanger stud and is adapted to receive the hanger stud in the aperture to securely hold the frame on the tree trunk. In addition, an automotive seat belt is attached to the frame of the tree stand and is wrapped around the tree trunk to more securely hold the tree stand to the trunk. A pair of projections extend from the frame towards the tree trunk provide added frictional contact and in conjunction with the seat belt and the pin up system to firmly and safely support the tree stand on the tree trunk.

24 Claims, 14 Drawing Figures

TREE STAND WITH PIN UP SYSTEM

BACKGROUND OF THE INVENTION

1. Field of the Invention

This invention relates to a tree stand with a pin up system for hanging the tree stand on a trunk of a tree by a detachable screw-in hanger pin.

2. Description of the Related Art

Tree stands are employed by hunters, outdoorsmen, nature photographers and the like for creating a temporary perch on a tree. In the sport of bow hunting, especially when pursuing game such as deer and the like, it is necessary for the hunter to be perched in the tree high above the ground for long periods of time to prevent the game from seeing or picking up the scent of the hunter. There are many types of tree stands which have been developed over the years available to hunters, however, many of these do not provide a comfortable and stable platform from which the hunter can observe and shoot his prey. U.S. Pat. Nos. 3,719,252, 3,949,835, 3,990,537, 3,729,160, 1,437,964 and 965,697 all disclose seats or platforms which may be fastened to a tree by a single screw which contacts the surface of the tree along one or more supporting members. For example, U.S. Pat. No. 3,729,160 issued to D'Imperio on Apr. 24, 1973 discloses a TREE SEAT in which the primary support comprises a crank shaped support rod which is screwed into the tree. The rod helps support the TREE SEAT both from a bracket on the top of the seat, and from underneath the seat. However, the TREE SEAT disclosed by D'Imperio does not provide a very stable platform from which the hunter can be safely perched high above the ground for long periods of time or from which the hunter may safely shoot his weapon be it a bow, rifle or the like at his prey. In addition, attachment of the crank to the bracket of the D'Imperio TREE SEAT requires threading the crank through the bracket and the seat, a manuever which would prove difficult and quite hazardous high above the ground.

Another type of tree stand is disclosed in U.S. Pat. No. 4,445,491 issued to Mitchell on May 1, 1984 for LIGHTWEIGHT, PORTABLE HUNTER'S TREE STAND. However, Mitchell's disclosure requires that one end of the stand be wedged against the tree trunk while another end is anchored by a standard screw or bolt. The hunter must therefore carry extra equipment to screw the bolt into the tree trunk. Also, the Mitchell disclosure requires the second V-shaped end of the tree stand to be wedged against a branch. The stand is largely dependent upon the strength and the existence of the appropriately shaped and angled branch, and if the branch is not of sufficient strength the stand may break the branch and collapse under the weight of the hunter potentially causing serious injuries.

Other tree stands are disclosed in U.S. Pat. Nos. 3,961,686, 3,817,350, 4,475,627 and 4,474,265 which do not use a screw as an anchor device. These stands employ cumbersome belts, chains and clamping devices to hold these stands to a tree trunk.

For example, U.S. Pat. No. 4,474,627 issued to Eastridge on Oct. 9, 1984 discloses a PORTABLE TREE STAND/CAMP STOOL which is fastened to the trunk of the tree by a chain, a wedge bar and braces. The Eastridge tree stand requires the user to carry the stand and chains high up on the tree and fasten the chains around the tree trunk. These chains may be quite heavy and cumbersome and there is no stable anchoring point to securely hold the tree stand to the tree while the chain is being adjusted. Consequently, installation of the tree stand in the tree is difficult and dangerous due to the weight of the chain, manner of tightening the chain and the lack of an initial anchor for installation of the tree stand. Furthermore, since the wedge bar is not independently affixed to the tree trunk, if the chain breaks or loosens, the stand along with the hunter will fall from the tree, potentially causing serious injuries.

Another example is disclosed in U.S Pat. No. 4,474,265 issued to Shinkle on Oct. 2, 1984 for a TREE CHAIR. The Shinkle TREE CHAIR requires the use of several fastening devices including strapping, ties and a separate tree stand for the hunter to rest his feet. The Shinkle TREE CHAIR requires installation and adjustment of several belts and ties, an operation which is quite difficult and unsafe to perform high above the ground. In addition, as with the Eastridge patent there is no fixed anchor point to initially hold the TREE STAND while the cords, lines and fastening devices can be attached.

Also of possible interest are U.S. Pat. Nos. 4,415,061; 4,413,706; 3,498,409; 3,380,697; 3,298,459; 1,588,566; 706,292 and 481,724 which discloses various apparatus which may be used or adapted for tree climbing or for attachment of a temporary foothold to the surface of a tree. For example, U.S. Pat. No. 3,298,456 for TREE CLIMBING APPARATUS issued to Bergsten on Jan. 17, 1967 discloses a crank shaped apparatus for tree climbing.

Although not believed to be prior art but cited herein for sake of completeness is Applicant's pending U.S. patent application Ser. No. 900,288 filed on Jan. 24, 1986 for a PORTABLE TREE STEP which discloses a crank shaped tree step with a removable bolt for fastening into the trunk of a tree.

In summary, none of the related art discloses a light and easily portable tree stand which may be anchored to the trunk of a tree and stabilized by an easily installed screw-in anchoring device.

SUMMARY OF THE INVENTION

Briefly described, the invention comprises a tree stand with pin up system for easily attaching a tree stand to a tree at a position high above the ground and for easy removal after use. The tree stand comprises a frame which provides a structure for attaching the components of the tree stand. A platform is attached to the frame for supporting the weight of a user and the user's equipment. A rectangular hanger stud is attached to the frame and projects from the frame towards the ground. The tree stand is attached to the tree trunk with a tree stand pin which has a shank that tapers at one end and ends with a pointed screw tip for penetrating into the tree trunk. A crank is attached to the shank and has a handle attached to one end for rotating the screw tip of the shank and facilitating penetration of the screw tip and shank into the tree trunk. A stud holder is attached to the shank and has an aperture with about the same rectangular cross-sectional shape as the hanger stud. The stud holder is thus adapted to receiver the hanger stud in the rectangular aperture and securely hold the frame on the tree trunk. In addition, an automotive seat belt is attached to the frame of the tree stand and is wrapped around the tree trunk to more securely hold the tree stand to the trunk. Along with the seat belt, a pair of projections extending from the frame towards the tree trunk provide added frictional contact and support on the tree trunk.

The hanger pin can easily be attached to the tree trunk by placing the pointed screw tip against the tree trunk and turning the crank to drive the screw tip and shank into the tree trunk. Once the shank has advanced as far as possible, the tree stand may be placed on the tree stand pin by inserting the hanger stud through the aperture in the stud holder of the hanger pin. The seat belt is then fastened around the tree trunk forcing the projections against the tree trunk. After use, the seat belt can be released and the tree stand can be lifted off the hanger pin. The hanger pin may be left in the tree for subsequent reuse, or rotated by using the crank in the reverse direction from which it was inserted in order to back the shank and screw tip out of the tree trunk so that the hanger pin can be reused on another tree.

In addition, the invention also includes a bracket to which the hanger stud of the present invention can be attached. The bracket and the attached hanger stud are then affixed to a horizontal frame section of a tree stand by means of screws, bolts or other attachment apparatus so that almost any tree stand can then be used with the hanger pin of the present invention.

These and other features of the present invention will be more fully understood by reference to the following drawings.

DETAILED DESCRIPTION OF THE INVENTION

During the course of this description like numbers will be used to identify like elements according to the different views which illustrate the invention.

Figure 1:
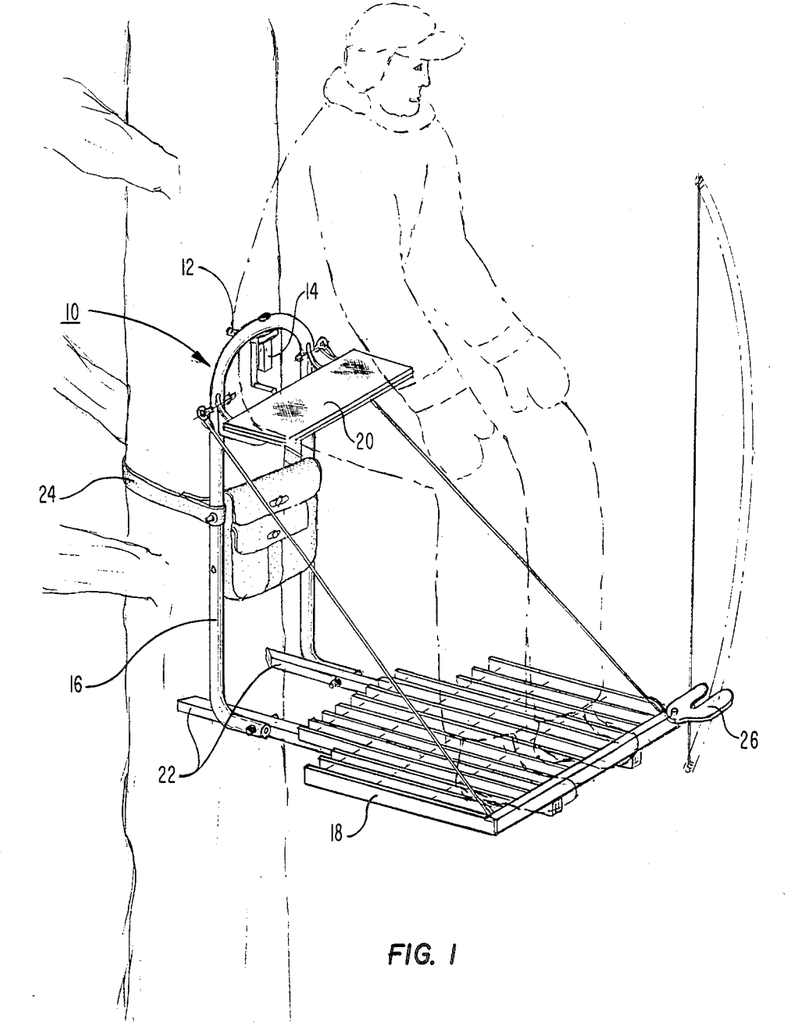
FIG. 1 is a perspective view of the preferred tree stand with pin up system of the present invention illustrated during use.
Figure 2:
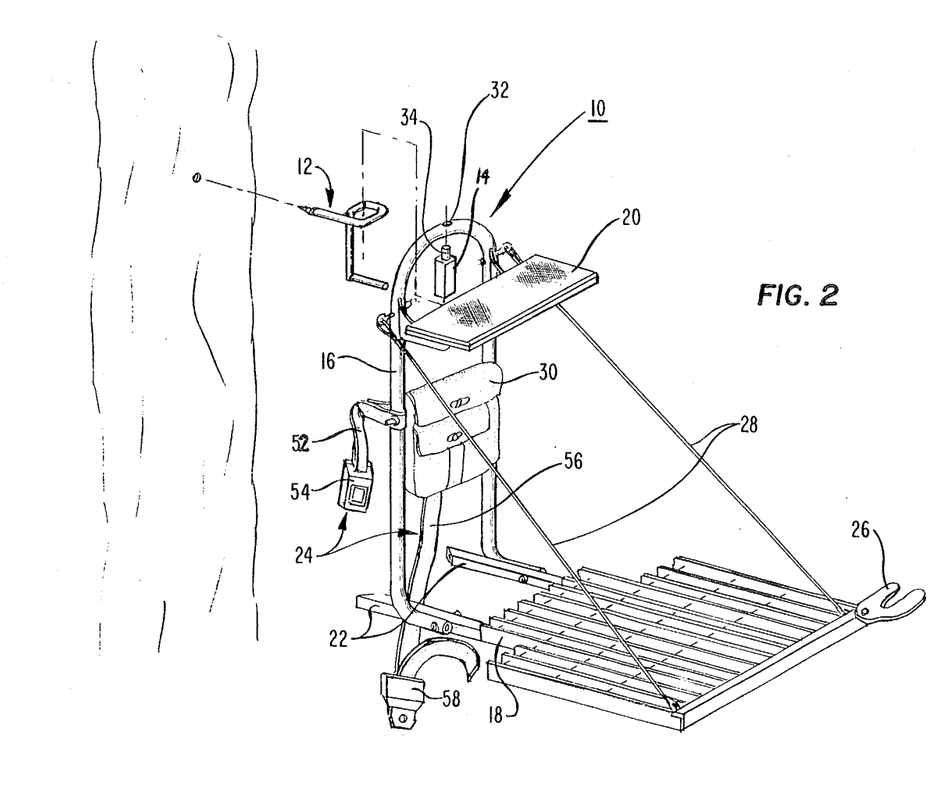
FIG. 2 is a perspective view of the preferred embodiment illustrated in FIG. 1 shown with the hanger pin removed from the tree and the hanger stud removed from the frame of the tree stand.
Figure 3A:
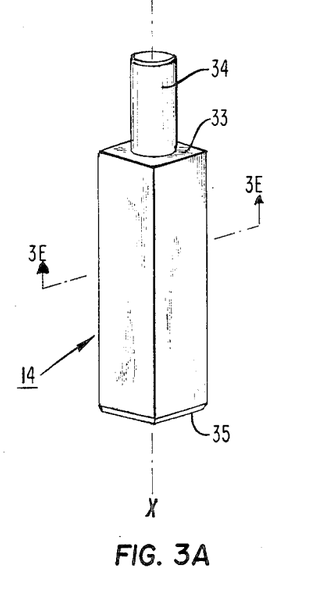
FIG. 3A is a detail perspective view of the hanger stud illustrated in FIG. 2.
Figure 3B:
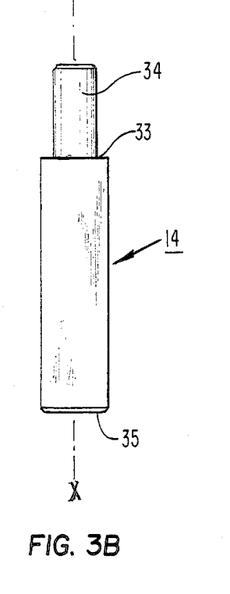
FIG. 3B is an elevational view of the hanger stud illustrated in FIG. 3A.
Figure 3C:
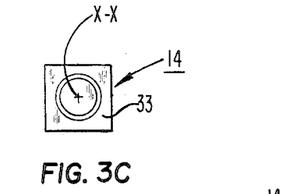
FIG. 3C is a top plan view of the hanger stud illustrated in FIG. 3A.
Figure 3D:
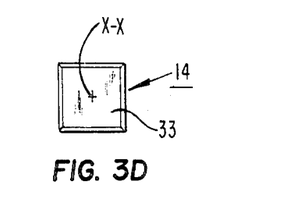
FIG. 3D is a bottom plan view of the hanger stud illustrated in FIG. 3A.
Figure 3E:
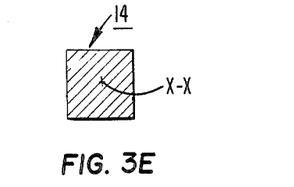
FIG. 3E is a cross-sectional view of the hanger stud illustrated in FIG. 3A taken through line 3E—3E in the direction of the arrows.

The preferred embodiment of the invention 10 is illustrated in detail in FIGS. 1 through 6. The preferred tree stand with pin up system 10 shown in FIGS. 1 and 2 includes a tubular U shaped frame 16 to which platform 18 is attached. In use, frame 16 is aligned about parallel to the tree and about perpendicular to the ground while platform 18 is aligned about perpendicular to frame 16 and generally about parallel to the ground. Mounted at the uppermost portion of frame 16 is hanger stud 14 which extends from frame 16 towards the ground generally about parallel to the surface of the tree. As shown in FIG. 2, hanger stud 14 is attached to the frame 16 through aperture 32 by projection 34 which extends from the top end 33 of hanger stud 14 along the long central axis X—X of hanger stud 14. It is preferred that the cross-sectional shape of hanger stud 14 when viewed along line 3E—3E in the direction of the arrows is rectangular, see FIGS. 3A and 3E. The rectangular cross-sectional shape of hanger stud 14 is advantageously used with a complimentary aperture 41 having a rectangular cross-section in stud holder 40 of hanger pin 12, as described below, to prevent hanger stud 14 and attached tree stand 10 from rotating about the long central axis X—X when the tree stand 10 is attached by hanger pin 12 to the surface of a tree. However, it is contemplated that the cross-sectional shape of the hanger stud 14, shown in FIG. 3E, may also be triangular, hexagonal, in the shape of any other polygon, round, oval or any other shape as long as it is a shape which is complimentary to and can be inserted through aperture 41 in stud holder means 40 of hanger pin 12 described below.

A hanger pin 12 for anchoring the tree stand 10 to the trunk of a tree includes a shank 38 which is tapered at one end until it comes to a pointed tip 37 with screw flights 36 running from pointed tip 37 up onto shank 38. The pointed tip 37 and screw flights 36 on the tapered end of shank 38 are adapted for penetrating into wood such as a tree trunk. Crank 42 is attached to shank 38 opposite tip 37. Crank 42 includes shaft 44 which is attached at one end to shank 38 at attachment point 39 and at the other end to handle 46 which is disposed approximately perpendicular to shaft 44. Crank 42 is used to rotate shank 38 and screw flights 36 to facilitate the penetration of shank 38 into the trunk of a tree or similar supporting surface. Stud holder 40 is attached to shank 38 opposite tip 37 at approximately the same attachment point 39 of shank 38 where crank 42 is attached. Stud holder 40 includes a rectangular aperture 41 which receives and holds hanger stud 14 when hanger pin 12 is properly attached to the trunk of the tree so that the rectangular aperture 41 is aligned approximately parallel to the ground as shown in FIGS. 1 and 2. The preferred hanger pin 12 is made form a single metal shaft which is bent, forged and welded to form the step shape shown in FIGS. 2 and 4 and the shaft 38 is welded to shank 44 at attachment point 39 to form stud holder 40 having aperture 41. Handle 46 of crank 42 is either bent from shank 44 or welded or otherwise attached to shank 44. Shaft 38 is cut with an appropriate cutting tool in order to form tapered screw flights 36 which taper down to tip 37.

Figure 4A:
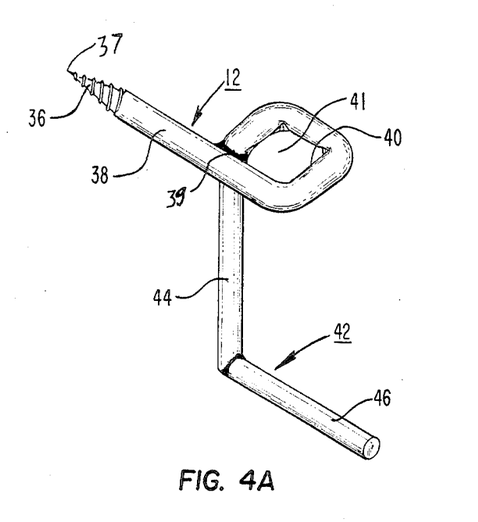
FIG. 4A is a detail perspective view of the hanger pin illustrated in FIG. 2.
Figure 4B:
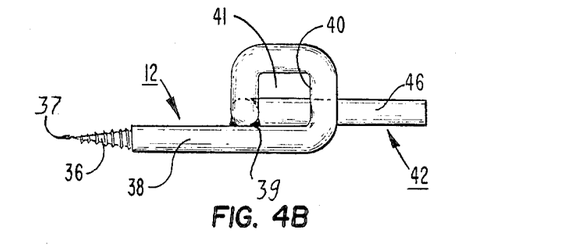
FIG. 4B is an enlarged top plan view of the hanger pin illustrated in FIG. 4A.
Figures 4C, 4D:
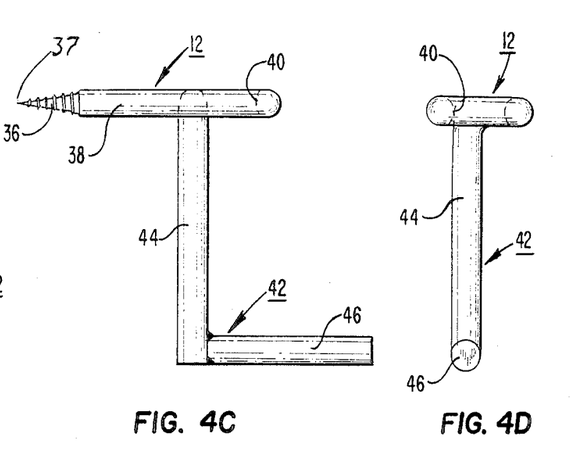
FIG. 4C is a side elevational view of the hanger pin illustrated in FIG. 4A.
FIG. 4D is a rear elevational view of the hanger pin illustrated in FIG. 4A.
Figure 4E:
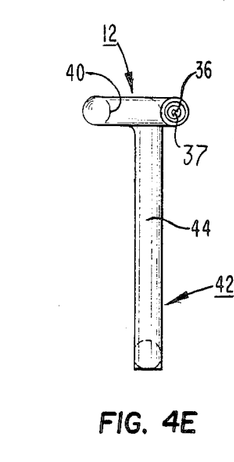
FIG. 4E is a front elevational view of the hanger pin illustrated in FIG. 2.

Although the preferred shape of aperture 41 in stud holder 40 is rectangular so that hanger stud 14 fits snugly inside aperture 41 of stud holder 40, and prevents hanger stud 14 and frame 16 from rotating in aperture 41 about the long central axis X—X of hanger stud 14. The shape of aperture 41 may also be polygonal, ellipsoid, irregularly shaped or round. However, no matter what the shape of aperture 41, it must be appropriately shaped to accommodate hanger stud 14 so as to allow frame 16 to be supported by hanger pin 12 and thus connect the preferred tree stand 10 to the surface of the tree trunk or similar supporting surface.

Figure 5:
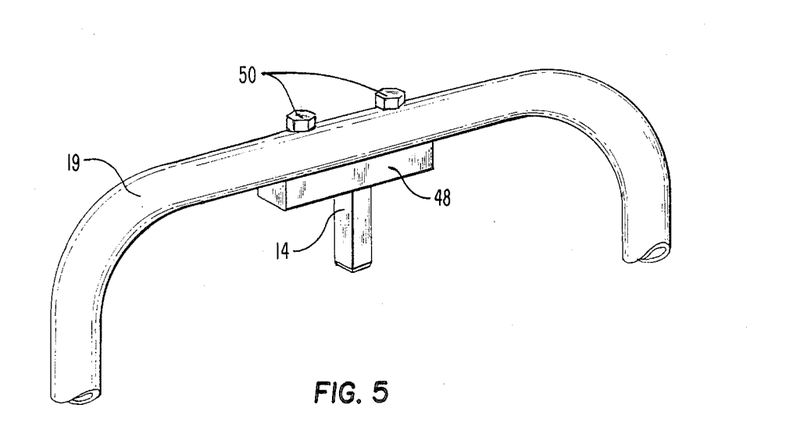
FIG. 5 is a perspective view of the bracket and hanger stud for attaching the hanger stud to most tree stands.
Figure 6:
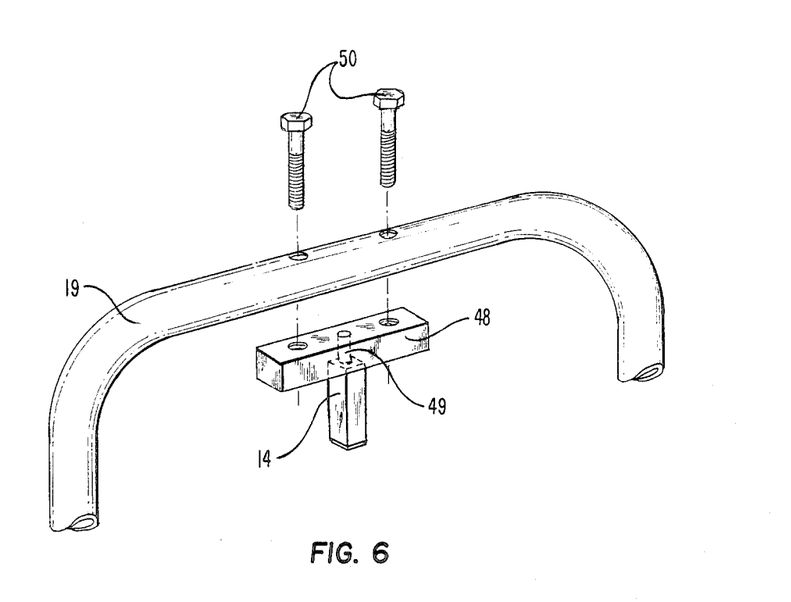
FIG. 6 is an exploded perspective view of the bracket and hanger stud shown in FIG. 5 with the hanger stud removed from the bracket and also showing hardware for attaching the bracket to most tree stands.

Alternatively, the present invention contemplates that almost any other tree stand having a frame 19 may be adapted to be used with the hanger stud 14 and hanger pin 12 of the present invention by means of bracket 48, shown in FIGS. 5 and 6, to which hanger stud 14 is attached. The preferred manner of attaching hanger stud 14 to bracket 48 is by inserting projection 34 into hole 33 of bracket 48 and then welding or otherwise solidifying the connection between hanger stud 14 and bracket 48. Accordingly, hanger stud 14 is attached to bracket 48 in a similar manner than was described above for the attachment of hanger stud 14 to frame 16 of the preferred tree stand 10 of the present invention. Bracket 48 with attached hanger stud 14 projecting approximately perpendicular from bracket 48 is then attached to a frame 19 of almost any other tree stand by attachment hardware 50. Attachment hardware 50 may include bolts or other hardware for affixing bracket 48 to frame member 19 of the other tree stand.

The preferred tree stand 10 illustrated in FIGS. 1 and 2 also includes a belt attachment device 24 which is attached to frame 16 for wrapping around the tree trunk to more securely hold the tree stand 10 to the tree trunk. The preferred belt attachment device 24 includes a first strap 52 with one end which is attached to the side of frame 16 and an automotive type seat belt buckle 54 which is attached at its other end. A second strap 56 is attached to the opposite side of frame 16 from the attachment point of strap 52. Strap 56 includes an adjustable automotive seat belt plate 58 which releasably locks into buckle 54. In addition, the preferred tree stand 10 illustrated in FIGS. 1 and 2 includes a means for gripping and frictionally holding frame 16 onto the surface of the tree trunk. The preferred means for gripping the tree trunk includes two parallel tubular metal shafts 22 which extend from platform 18 past frame 16 towards the surface of the tree trunk.

Accordingly, the preferred tree stand with pin up system 10 can be doubly secured to the tree trunk by placing the hanger stud 14 into aperture 41 of the hanger pin 12 and then wrapping the belt attachment device 24 around the tree trunk and locking seat belt plate 58 in seat belt buckle 54. The belt attachment device 24 is then tightened by adjusting strap 56 so that the tubular shafts 22 press against the tree trunk to more securely hold the tree stand 10 onto the tree trunk. The combination of support provided by hanger stud 14 and hanger pin 12, the belt attachment device 24 and the gripping provided by the tubular metal shaft 22 provide the necessary stability for a hunter to safely observe and shoot his prey from the preferred tree stand 10 when it is perched high above the ground. Since the combination of the two systems for attaching the tree stand 10 to the tree trunk function independently of one another, failure of either system does not lead to a catastrophic fall. Rather, in an emergency situation the second system temporarily supports the tree stand 10 until appropriate repairs of adjustments can safely be performed so that both attachment systems are functional.

The preferred tree stand with pin up system 10 also includes seat 20 which is disposed about parallel to platform 18 and is attached to frame 16 between the attachment point of hanger stud 14 and belt attachment device 24, see FIGS. 1 and 2. The preferred tree stand 10 may also include a pouch 30 mounted on frame 16 below seat 20, and a weapon holding device attached to platform 28, such as the bow holder 26 shown in FIGS. 1 and 2.

In addition, the tree stand 10 shown in FIGS. 1 and 2 is collapsible, so that platform means 18 folds back upon the frame 16 and both hinges 60. In order to keep platform 18 from not collapsing downwards during use, platform restraining cables 28 are attached to frame 16 at approximately the attachment point of seat 20. The other ends of platform restraining cables 28 are attached to the outermost corners of platform 18 so that platform 18 may be freely pivoted towards seat 20 when collapsing the tree stand 10. However, when platform 18 is unfolded and pivoted away from frame 16 to a position approximately perpendicular to frame 16 then platform restraining cables 28 fully extend to hold platform 18 and prevent it from pivoting more than the 90 degree angle from frame 16 that is necessary to maintain platform 18 approximately parallel to the ground when the preferred tree stand with pin up system 10 is in use.

When using the preferred tree stand with pin up system 10 of the present invention, the user, e.g. a hunter, selects an appropriate position on a tree trunk suitable for observing and shooting his prey. The hunter inserts the hanger pin 12 into the trunk of the tree by pressing the pointed tip 37 of the hanger pin 12 into the surface of the tree trunk, and while holding shank 38 approximately parallel to the ground, turns crank 42 by using handle 46 and thus rotates shank 38 and screw flights 36 driving them into the surface of the tree as far as possible. The hunter then adjusts crank 42 so that handle 46 is closest to the ground in order to position stud holder 40 so that opening 41 is aligned approximately parallel to the ground. The hunter then lifts tree stand 10 so that the top portion of the frame 16 to which hanger stud 14 is attached is positioned over aperture 41 of hanger pin 12. Tree stand 10 is then lowered to insert hanger stud 14 into and through aperture 41 of stud holder 40, resting frame 16 on stud holder 40 and shank 38 of hanger pin 12 to anchor the tree stand 10.

Once the tree stand 10 is anchored by hanger pin 12 platform 18 is pivoted away from frame 16 to fully extend restraining wires 28 so that platform 18 is approximately perpendicular to frame 16 and approximately parallel to the ground. Also, unfolding platform 18 pivots the tubular metal shafts 22 so that they are facing towards the surface of the tree trunk. The belt restraining device 24 is then fastened around the tree trunk by inserting seat belt plate 58 into buckle 54. Then, the belt restraining device 24 is adjusted by tightening strap 56 in adjustable automotive type seat belt plate 58 until the tubular metal shaft 22 are forced against the tree trunk in order to frictionally grip and hold frame 16 onto the surface of the tree trunk.

After use, the preferred tree stand with pin up system 10 may be removed by releasing the belt attachment device 24 by releasing automotive type seat belt buckle 54 from plate 58. The platform 18 is then folded towards frame 16 so that platform 18 is aligned almost parallel to frame 16 and tubular metal shafts 22 point towards the ground. The tree stand 10 is then lifted upwards away from the ground sliding hanger stud 14 out of opening 41 of stud holder 40. The tree stand is then be lowered to the ground by using a rope or by other suitable means. The hanger pin 12 is either left in the tree trunk for future use or removed from the tree trunk by turning crank 42 using handle 46 in the opposite direction which it was turned when hanger pin 12 was inserted into the tree trunk. For example, if hanger pin was inserted by turning crank 42 clockwise, crank 42 should be rotated counterclockwise to remove hanger pin from the tree trunk. The hanger pin is then be stored in pouch 26 for future use.

While the invention has been described with reference to the preferred embodiment thereof, it will be appreciated by those of ordinary skill in the art that various modifications can be made to the structure and function of the invention without department from the spiriting and scope thereof.

I claim:

1. A tree stand with pin up system for attaching to a support object at a position elevated from the ground, comprising:
   (a) frame means for providing a structure to attach all components of the tree stand;
   (b) platform means attached to said frame means and aligned generally parallel to the ground adapted for supporting a user and equipment;
   (c) hanger stud means projecting from said frame means for facilitating hanging of the tree stand on the support object; and
   (d) pin up means for hanging said tree sand on said support object which includes:
      (i) a screw section for penetrating into said support object;
      (ii) cranking means for rotating said screw section; and
      (iii) a stud holder having an aperture adapted for receiving said hanger stud means to hang said tree stand by said frame means on said support object.

2. The invention according to claim 1, wherein said screw section includes a shank which is tapered at one end and terminates at a pointed tip with screw flights extending from said tip along said tapered end onto said shank portion.

3. The invention according to claim 2, wherein said cranking means includes a shaft having a first end extending generally perpendicular from said shank of said screw section and a second end to which a handle is attached.

4. The invention according to claim 3, wherein said stud holder is attached to said shank of said screw section.

5. The invention according to claim 4, wherein said hanger stud means has a long central axis and a polygonal cross-sectional shape perpendicular to said long axis; and,
   the aperture in said stud holder has approximately the same polygonal cross-sectional shape as said cross-section of the hanger stud means whereby the cross-sectional shape of the aperture in said stud holder allows the stud holder to hold said hanger stud means and prevents it from rotating to securely hold said frame means on said support object.

6. The invention accordingly to claim 5, wherein said polygonal cross-section of said hanger stud means is rectangular, and said aperture in said stud holder means has approximately the same rectangular cross-sectional shape as said hanger stud means.

7. The invention according to claim 7, further including a belt attachment means attached to said frame means, said belt attachment means wrapping around said support object for more securely attaching said frame means to said support object.

8. The invention according to claim 7, further comprising gripping means projecting from said frame means to said support object for providing fictional contact with said support object.

9. The invention according to claim 8, wherein said belt attachment means comprises a seat belt apparatus having a first strap including an automotive type seat belt buckle attached to one side of said frame means, and a second strap including an automotive type seat belt buckle insertion plate for inserting into said seat belt buckle attached to a second side of said frame means.

whereby said belt attachment means is adapted to be easily buckled and unbuckled and easily adjusted for different diameter support objects.

10. The invention recited in claim 9, wherein said hanger stud means includes a projection extending from one end of said hanger stud along said long axis, said projection extending through said frame means to attach said hanger stud means to said frame means.

11. A pin up system for attaching a tree stand to a support object at a position elevated from the ground, comprising:
    (a) hanger stud means projecting from a frame of said tree stand; and,
    (b) pin up means for hanging said tree stand on said support object, including:
       (i) screw section for penetrating into said support object;
       (ii) cranking means for rotating said screw section; and
       (iii) stud holder having an aperture adapted for receiving said hanger stud means to hang said tree stand by said frame means on said support object.

12. The invention according to claim 11, wherein said screw section includes a shank which is tapered at one end and terminates at a pointed tip with screw flights extending from said tip along said tapered end onto said shank.

13. The invention according to claim 12, wherein said cranking means includes a shaft having a first end extending from said shank of said screw portion and a second end to which a handle is attached.

14. The invention according to claim 13, wherein said stud holder is attached to said shank of said screw section.

15. The invention according to claim 14, wherein said hanger stud means has a long central axis and a polygonal cross-sectional shape perpendicular to said long axis; and,
    the aperture in said stud holder has approximately the same polygonal cross-sectional shape as said cross-section of the hanger stud means whereby the shape of the aperture in said stud holder allows the stud holder to hold said hanger stud means and prevents it from rotating to securely hold said frame means on said support object.

16. The invention accordingly to claim 15, wherein said polygonal cross-section of said hanger stud means is rectangular, and said aperture in said stud holder has approximately the same rectangular cross-sectional shape as said hanger stud means.

17. The invention according to claim 6, further including a belt attachment means attached to said frame means, said belt attachment means wrapping around said support object for more securely attaching said frame means to said support object.

18. The invention recited in claim 18, wherein said hanger stud means includes a projection extending from one end of said hanger stud means said projection extending through said frame means to attach said hanger stud means to said frame means.

19. A pin up system for attaching a tree stand to a support object at a position elevated from the ground, comprising:
 (a) hanger stud means having a long central axis said hanger stud means being attached at one end to a bracket means, so that said bracket means is about perpendicular to said long central axis, said bracket means being adapted for attachment to said frame means of said tree stand; and
 (b) pin up means for hanging said tree stand on said support object, including
  (i) screw section includes a shank which is tapered at one end and terminates at a pointed tip with screw flights extending from said tip along said tapered end onto said shank;
  (ii) cranking means including a shaft portion having a first end extending from said shank and a second end to which a handle is attached, said cranking means is adapted for rotating said screw means; and,
  (iii) stud holder having an aperture adapted for receiving said hanger stud means to hang said tree stand by said frame means on said support object.

20. The invention recited in claim 19, wherein said stud holder is attached to said shank of said screw section.

21. The invention recited in claim 20, wherein said hanger stud means includes a projection extending from one end of said hanger means along said long axis, said projection extending through said bracket means to attach said hanger stud means to said bracket means.

22. The invention according to claim 21, wherein said bracket means includes bracket-frame attachment means for attaching said bracket to said frame.

23. The invention according to claim 22, wherein said hanger stud means has a polygonal cross-sectional shape perpendicular to said long axis; and,
 the aperture in said stud holder has approximately the same polygonal cross-sectional shape as said cross-section of the hanger stud means whereby the cross-sectional shape of the aperture in said stud holder allows the stud holder to hold said hanger stud means and prevents it from rotating to securely hold said frame means on said support object.

24. The invention accordingly to claim 23, wherein said polygonal cross-section of said hanger stud means is rectangular, and said aperture in said stud holder has approximately the same rectangular cross-section as said hanger stud means.

* * * * *